United States Patent [19]

Hatanaka

[11] Patent Number: 5,083,208
[45] Date of Patent: Jan. 21, 1992

[54] ELECTRONIC ZOOM APPARATUS

[75] Inventor: Noriaki Hatanaka, Yokohama, Japan

[73] Assignee: Ricoh Company, Ltd., Tokyo, Japan

[21] Appl. No.: 452,602

[22] Filed: Dec. 19, 1989

[30] Foreign Application Priority Data

| Dec. 26, 1988 | [JP] | Japan | 63-168923[U] |
| Feb. 22, 1989 | [JP] | Japan | 1-42142 |
| Apr. 26, 1989 | [JP] | Japan | 1-49278[U] |
| Oct. 5, 1989 | [JP] | Japan | 1-260662 |

[51] Int. Cl.$^5$ .................. H04N 5/232; H04N 3/223
[52] U.S. Cl. .................................... 358/227; 358/180
[58] Field of Search ............................... 358/227, 180

[56] References Cited

U.S. PATENT DOCUMENTS

| 4,231,066 | 10/1980 | Merchant | 358/180 |
| 4,891,702 | 1/1990 | Nakayama et al. | 358/180 |
| 4,930,014 | 5/1990 | Maeda et al. | 358/180 |
| 4,951,125 | 8/1990 | Kojima et al. | 358/22 |

FOREIGN PATENT DOCUMENTS

| 2746285 | 4/1978 | Fed. Rep. of Germany | 358/180 |
| 63-69383 | 3/1988 | Japan . | |
| 63-82066 | 4/1988 | Japan . | |

*Primary Examiner*—Howard W. Britton
*Assistant Examiner*—Wendy R. Greening
*Attorney, Agent, or Firm*—Oblon, Spivak, McClelland, Maier & Neustadt

[57] ABSTRACT

An electronic zoom apparatus is used in an image pickup device constructing one frame while a raster scanning is performed with respect to image data of first and second fields. The apparatus comprises a memory for storing first image data of the first field and second image data of the second field; a frame making circuit for transmitting a control signal to the memory in accordance with a control signal transmitted from a control section such that the stored first and second image data are synthesized as one frame and are read at random; and an interpolating circuit for performing an interpolation processing with respect to the first and second image data transmitted from the memory by the control signal transmitted from the frame making circuit. Further, the apparatus may comprise an interpolating circuit control section for detecting the difference between adjacent first and second image data transmitted from the memory and controlling the interpolating circuit to be turned on and off by the detecting result. The interpolating circuit comprises a memory device for supplying the image data to be interpolated as an address signal and reading the image data stored to an address indicated by this address signal and interpolation-processed in advance by the image data. The data read out of the memory device are set to interpolating data.

6 Claims, 9 Drawing Sheets

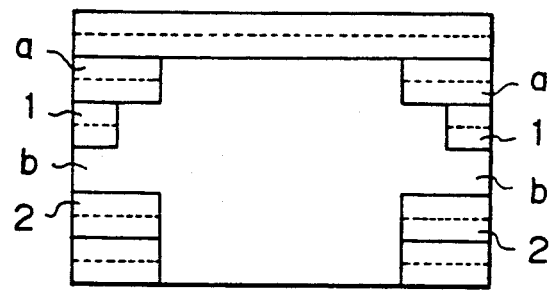
Fig. 6
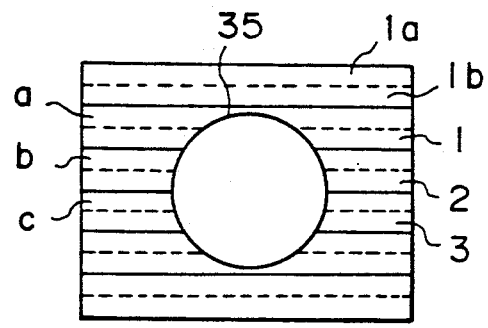
Fig. 9
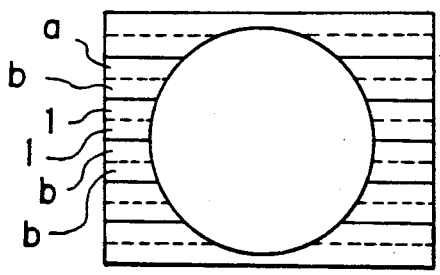
Fig. 10
Fig. 11

Fig. 14

| ADDRESS | | | | DATA |
|---|---|---|---|---|
| A | | B | | C |
| 0 | 0 | 0 | 0 | 0 |
| 0 | 0 | 0 | 1 | $n/mn$ |
| 0 | 0 | 0 | 2 | $2 \cdot n/mn$ |
| ⋮ | | | | ⋮ |
| | | | | ⋮ |
| 0 | 1 | 0 | 0 | $m/mn$ |
| 0 | 1 | 0 | 1 | 1 |
| ⋮ | | | | ⋮ |
| | | | | ⋮ |
| F | F | F | F | F F |

ELECTRONIC ZOOM APPARATUS

BACKGROUND OF THE INVENTION

1. Field of the Invention

The present invention relates to an electronic zoom apparatus used in a video camera, etc.

2. Description of the Related Art

In a video camera, etc. for transmitting information of a photographed image, the transmitted image information is converted to a digital signal through an analog/-digital (which is briefly called A/D in the following description) converter. All the converted image data are written to a semiconductor memory. When the image data are read, only an image processed to be enlarged for example is selected. A calculating processing is then performed with respect to the selected image data to enlarge or reduce the size of the image stored to the semiconductor memory. The video camera, etc. are provided with a so-called electronic zoom apparatus having such a construction.

In such an electronic zoom apparatus, a contour portion of an image cannot be clearly displayed when an electronic zoom processing is performed. When a frequency for sampling an original image is set to high, there is a possibility that the contour portion of the image is displayed slightly clearly. However, when a zoom ratio is set to be large, the image contour portion cannot be displayed clearly.

When the above-mentioned sampling frequency is set to be high in consideration of the zoom ratio, the capacity of the above semiconductor memory becomes very large, which is not preferable in system construction.

There is a case in which an interpolation processing circuit is disposed to improve the quality of the electronic zoom-processed image mentioned above. In this case, when the interpolation processing is performed at the real time with respect to the image data A/D converted at a ratio 20 to 30 mega-sample/second (which is briefly called MSPS in the following description), it is necessary to perform the interpolation processing at a speed 34 to 50 nanoseconds. To execute such a calculating processing at a high speed, it is necessary to dispose a large-sized computer, etc. so that such a construction is not real. It is considered to use a digital signal processor (which is briefly called DSP in the following description), etc. Such a method has a general purpose, but has problems in consideration of operating time, etc. even when a pipeline processing is performed, and further becomes large-sized as a system.

As mentioned above, in the interpolating circuit, it is difficult to practically execute the interpolation processing of the image at the real time. Further, no interpolation processing is performed in many cases because of such problems.

SUMMARY OF THE INVENTION

It is therefore a first object of the present invention to provide an electronic zoom apparatus which can clearly display a contour portion of an image when an electronic zoom processing is performed.

A second object of the present invention is to provide an electronic zoom apparatus which can clearly display the image contour portion even when the electronic zoom processing is performed with respect to a moving image.

A third object of the present invention is to provide an electric zoom apparatus provided with an interpolating circuit for performing an interpolation processing at a high speed with respect to the electronic zoom-processed image data.

The above objects of the present invention can be achieved by an electronic zoom apparatus used in an image pickup device constructing one frame while a raster scanning is performed with respect to image data of first and second fields, the apparatus comprising a memory for storing first image data of the first field and second image data of the second field; a frame making circuit for transmitting a control signal to the memory in accordance with a control signal transmitted from a control section such that the stored first and second image data are synthesized as one frame and are read at random; and an interpolating circuit for performing an interpolation processing with respect to the first and second image data transmitted from the memory by the control signal transmitted from the frame making circuit.

Further, in the present invention, the electronic zoom apparatus may comprise an interpolating circuit control section for detecting the difference between adjacent first and second image data transmitted from the memory and controlling the interpolating circuit to be turned on and off by the detecting result.

The interpolating circuit comprises memory means for supplying the image data to be interpolated as an address signal and reading the image data stored to an address indicated by this address signal and interpolation-processed in advance by the image data. The data read out of the memory means are set to interpolating data.

In the above construction of the present invention, the memory stores the respective data of the first and second fields within the image data converted to a digital signal in accordance with the control signal transmitted from the control section. The respective image data of the first and second fields stored to the memory are read in accordance with the control signal transmitted from the frame making circuit so as to clearly display a contour portion of the image when the image data transmitted from the memory are displayed on a screen. The read image data are transmitted from the memory. At this time, the read data are provided in a sequential order of a first field line at the writing time and a second field line at the writing time. The interpolating circuit control section detects the difference between the image data adjacent to each other with respect to the read image data of the first and second fields, and operates the interpolating circuit only when this difference is detected. The interpolating circuit performs the interpolation processing with respect to the above adjacent image data.

The memory means disposed in the interpolating circuit does not obtain the interpolated data by addition, multiplication and division with respect to the supplied image data, but obtains the interpolated image data by setting the supplied image data as an address signal and reading the image data interpolation-processed in advance and stored to an address indicated by this address signal, i.e., by performing a data-conversion.

Further objects and advantages of the present invention will be apparent from the following description of the preferred embodiments of the present invention as illustrated in the accompanying drawings.

BRIEF DESCRIPTION OF THE DRAWINGS

FIG. 6 is a view showing an image processed by the electronic zoom apparatus in the first embodiment of the present invention;

FIG. 9 is a view showing an original image in an electronic zoom processing;

FIG. 10 is a view showing an image processed by using the electronic zoom apparatus in the second embodiment of the present invention;

FIG. 11 is a view showing a memory state within a frame memory shown in FIG. 7;

FIG. 14 is a view showing data as an address signal supplied to the interpolating circuit and interpolation-processed data;

DESCRIPTION OF THE PREFERRED EMBODIMENTS

The preferred embodiments of an electronic zoom apparatus in the present invention will now be described in detail with reference to the accompanying drawings.

Figure 1:
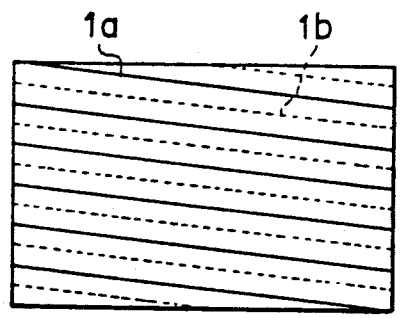
FIG. 1 is a view showing the construction of a display screen.

As shown in FIG. 1, normally, a first field 1a and a second field 1b are alternately scanned by interlaced scanning and form one frame, i.e., one picture with respect to a video signal transmitted from an image pickup device such as a video camera, etc.

Figure 2:
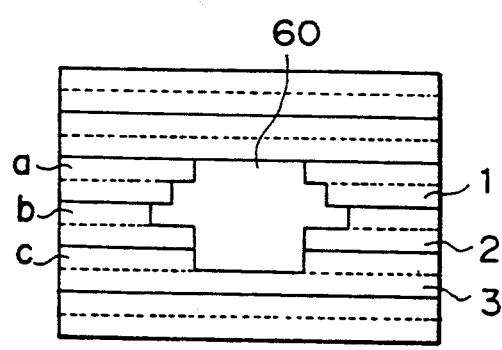
FIG. 2 is a view showing an original picture in an electronic zoom processing.
Figure 3:
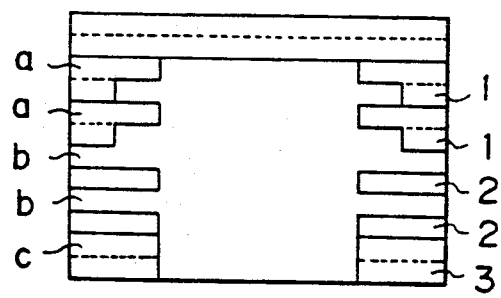
FIG. 3 is a view showing an image processed by a general electronic zoom apparatus.

When an electronic zoom processing is performed on the basis of image data written to a semiconductor memory as shown in FIG. 2 for example, the data are read in a sequential order a, a, b, b, c and c with respect to lines represented by reference numerals a, b and c for example within the first field 1a. Further, the data are read in a sequential order 1, 1, 2, 2, 3 and 3 with respect to lines represented by reference numerals 1, 2 and 3 for example within the second field 1b. When the image is displayed on a screen by such a processing, the displayed image is enlarged twice in size in comparison with the original image as shown in FIG. 3. However, the scanned lines are provided in a sequential order a, 1, a, 1, b, 2, b, 2, ... and the image data of the first field 1a and the image data of the second field 1b are alternately scanned so that a contour portion of the image is not accurately displayed and is therefore not displayed clearly.

Figure 4:
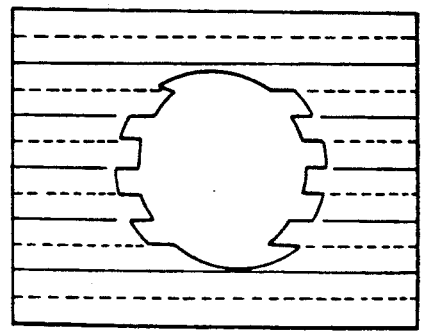
FIG. 4 is a view showing a moving image processed to be enlarged and displayed on the screen by the general electronic zoom apparatus.

Further, in an interlacing system, there is a time difference 1/60 second in the image display on the screen between the first field as an odd field and the second field as an even field. Accordingly, as shown in FIG. 4, when a moving image is processed to be enlarged, the contour portion of the image is displayed unclearly.

Figure 5:
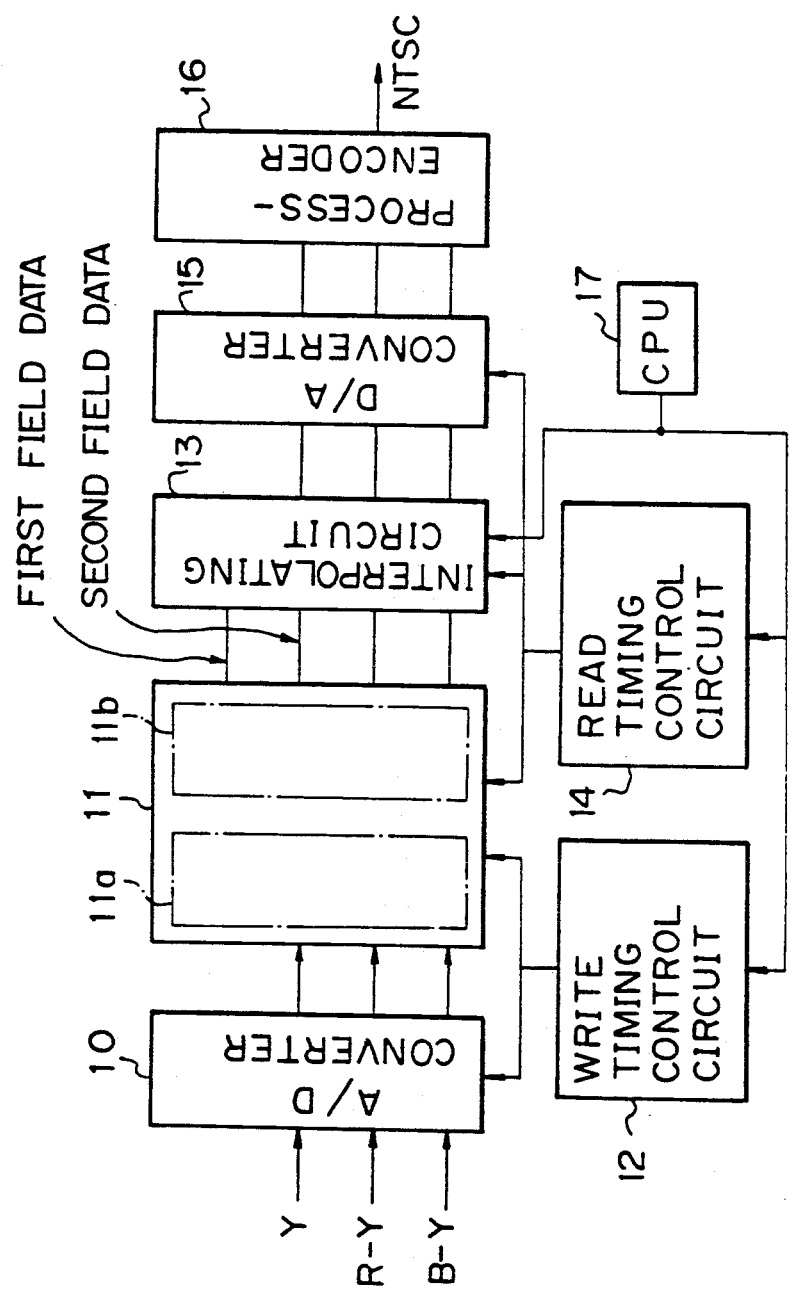
FIG. 5 is a block diagram showing the construction of an electronic zoom apparatus in a first embodiment of the present invention.

FIG. 5 shows an electronic zoom apparatus in a first embodiment of the present invention. In this figure, an unillustrated image pickup device is provided with an image pickup element or an image pickup tube and transmits color difference signals R-Y, B-Y as an analog signal and a brightness signal Y. This image pickup device is connected to an A/D converter 10 for converting a video signal composed of these color difference and brightness signals to a digital signal.

A write timing control circuit 12 is connected onto another input side of the A/D converter 10 and transmits a timing signal for converting only the video signal for executing an enlargement processing to a digital signal, and transmits an address signal. A frame memory 11 is connected onto an output side of the A/D converter 10 and has two memory portions 11a, 11b respectively storing image data of so-called first and second fields converted to a digital signal in accordance with the address signal transmitted from the write timing control circuit 12. A read timing control circuit 14 is connected onto another input side of the frame memory 11 and transmits an address signal and various kinds of timing signals. An interpolating circuit 13 is connected onto an output side of the frame memory 11 and performs an interpolation processing in accordance with the necessity with respect to image data transmitted according to the address signal of the read timing control circuit 14. The read timing control circuit 14 is connected onto one input side of the interpolating circuit 13, and a timing signal required at an operating time of the interpolation processing is supplied to this interpolating circuit 13. A digital/analog (which is briefly called D/A in the following description) converter 15 is connected onto an output side of the interpolating circuit 13 and converts a digital signal to an analog signal. The D/A converter 15 is connected to a processencoder circuit 16 for executing various kinds of processings with respect to a supplied video signal and transmitting an NTSC video signal.

A central processing unit (which is briefly called CPU in the following description) 17 is connected onto the input sides of the write timing control circuit 12, the read timing control circuit 14 and the interpolating circuit 13, and transmits a control signal to the respective circuits.

In the electronic zoom apparatus constructed as above in this embodiment, with respect to a video signal as an analog signal transmitted from the image pickup device, only image information processed to be enlarged on a screen is selected in the A/D converter 10 by a timing signal transmitted from the write timing control circuit 12 in accordance with a control signal transmitted from the CPU 17. Thereafter, this selected image information is converted to a digital signal and the converted image data are transmitted from the A/D converter 10 to the frame memory 11. The frame memory 11 stores the image data of the first and second fields to the respective memory portions 11a, 11b in accordance with an address signal transmitted from the write timing control circuit 12. The frame memory 11 reads out of the memory portions 11a, 11b, the respective image data of the first and second fields of a picture, a so-called frame stored by the address signal transmitted from the read timing control circuit 14 in accordance with the control signal transmitted from the CPU 17. In this case, the frame memory 11 reads the respective image data out of the memory portions 11a, 11b simultaneously or by repeating the first and second fields. The read image data are transmitted to the interpolating circuit 13. The data of the respective fields are read out of the frame memory 11 twice repeated when the magnification in enlargement processing is twice for example, and thereafter the reading operation starts to be performed with respect to the next frame.

The interpolating circuit 13 performs a so-called smoothing processing for smoothing a contour portion of the image. The interpolating circuit 13 is operated by a signal transmitted from the CPU 17 at only a necessary time when an operator operates a suitable switch. In this case, the image data of the first and second fields are read out of the above memory portions 11a, 11b to execute a known interpolation processing such as an arithmetical mean of the image data.

The read image data are converted to an analog signal by the D/A converter 15 in synchronization with a timing signal supplied from the read timing control circuit 14. This analog-converted image information is converted to an NTSC video signal by the process-encoder circuit 16 and is visually displayed on the display screen.

For example, when an image 60 on the screen shown in FIG. 2 is processed to be enlarged twice, only data of the digital-converted image 60 of the first field having fields a, b, c for example and the second field having fields 1, 2, 3 for example are respectively stored to the memory portions 11a, 11b within the frame memory 11 in synchronization with the timing signal transmitted from the write timing control circuit 12.

When the image data every field are read out of the frame memory 11, the data are read in a sequential order a, 1, b, 2, ... for example corresponding to the first field in the screen scanning by the timing signal transmitted from the read timing control circuit 14 by a command from the CPU, and the data are read in a sequential order a, 1, b, 2, ... for example corresponding to the second field. By performing the same operation twice repeatedly, the image data displayed on the screen are provided in a sequential order a, a, 1, 1, b, b, 2, 2, ... as shown in FIG. 6 so that an original image 30 is processed to be enlarged twice and a contour portion of the image 30 is not displayed unclearly as in the conventional apparatus.

The magnification in enlargement of the image is set by the timing signals transmitted from the write timing control circuit 12 and the read timing control circuit 14 by the control signal transmitted from the CPU 17. This magnification is set by suitably setting the relation between a timing in writing the image data to the frame memory 11 and a timing in reading the image data. The above description is made with respect to only the enlargement of the image. However, it is also possible to reduce the size of the image by suitably setting the above-mentioned timing signals.

In the electronic zoom apparatus of the present invention, the image data of only a portion processed to be enlarged or reduced in size are stored to the frame memory 11 so that it is not necessary to dispose a large amount of memory capacity for the frame memory 11.

Further, in particular, when the image is enlarged, the contour of the image can be smoothly displayed by operating the above-mentioned interpolating circuit 13.

A second embodiment of the present invention relates to an electronic zoom apparatus which can also effectively perform an electronic zoom processing with respect to a moving image on the basis of the zoom apparatus shown in the first embodiment mentioned above.

Figure 7:
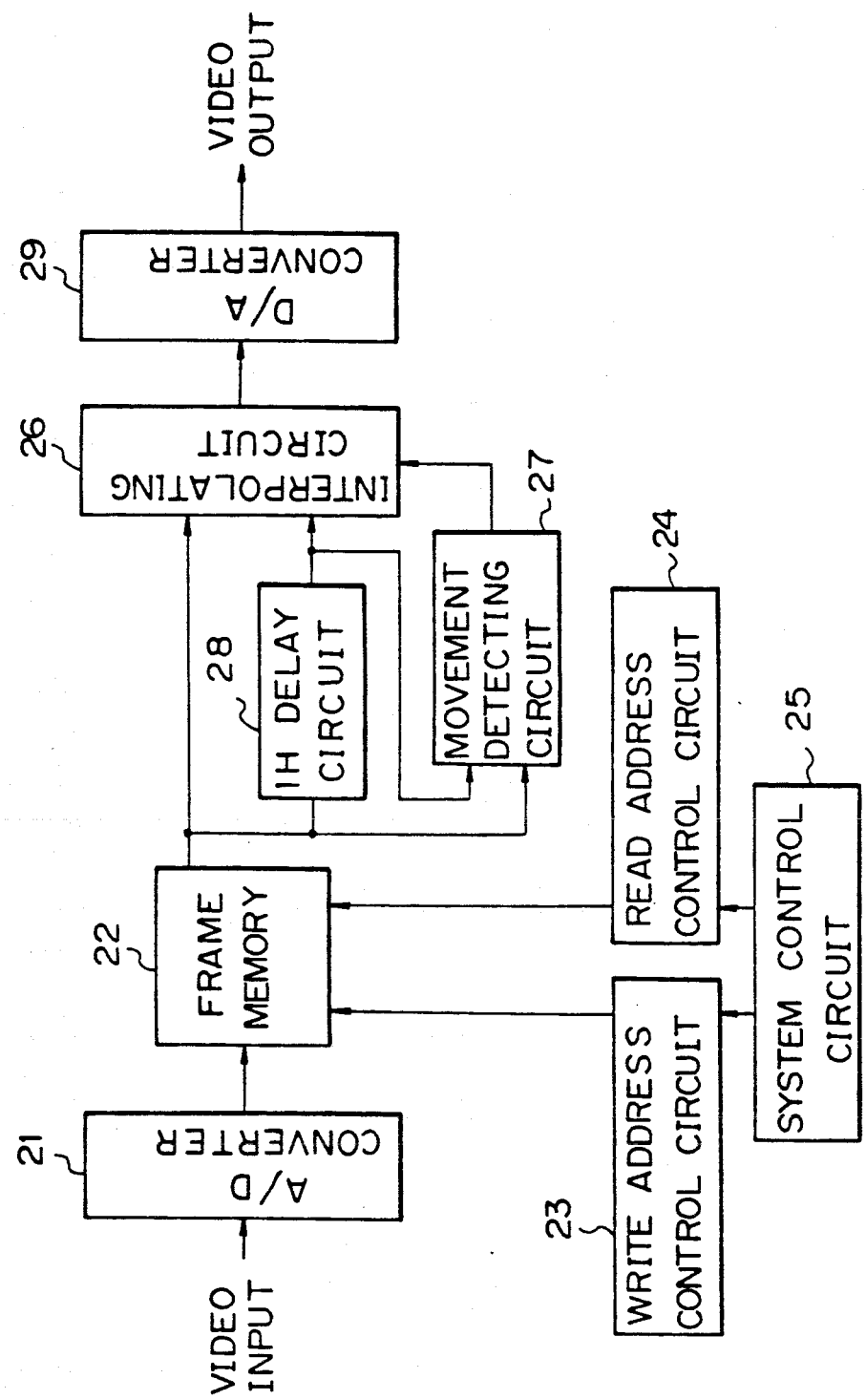
FIG. 7 is a block diagram showing the construction of the electronic zoom apparatus in a second embodiment of the present invention.

In FIG. 7 showing the electronic zoom apparatus in the second embodiment of the present invention, an unillustrated image pickup device is provided with an image pickup element and an image pickup tube and transmits color difference signals R-Y, B-Y as an analog signal and a brightness signal Y. This image pickup device is connected to an A/D converter 21 for converting a video signal composed of these color difference and brightness signals to a digital signal. A frame memory 22 is connected onto an output side of the A/D converter 21.

In this embodiment, all the photographed image data are not stored to the frame memory 22 of the electronic zoom apparatus as in the conventional apparatus, but only the image data processed to be enlarged are stored to this frame memory.

Accordingly, when the enlargement processing is performed in a range of the photographed image according to the magnification in enlargement, e.g., twice with respect to the image data of a so-called odd or first field and the image data of a so-called even or second field converted to a digital signal by the A/D converter 21, the image data in only a range corresponding to ¼ of the entire photographed image are written to the frame memory 22. The frame memory 22 is connected onto an output side of a write address control circuit 23 for controlling a writing operation of the above image data and an output side of a read address control circuit 24 for controlling a reading operation of the stored data according to the magnification in enlargement. The write address control circuit 23 and the read address control circuit 24 are connected onto an output side of a system control circuit 25 for controlling the operations thereof.

An output side of the frame memory 22 is connected to an interpolating circuit 26 for performing the interpolation processing of the image data transmitted in accordance with an address signal of the read address control circuit 24. The output side of the frame memory 22 is also connected to a 1H delay circuit 28 delaying the image data transmitted from the frame memory 22 by an amount 1H and repeatedly outputting the data of the first and second fields every 1H and making the delay of these data equivalent to that of one field amount. The output side of the frame memory 22 is further connected to a movement detecting circuit 27 for detecting whether or not there is a movement with respect to the image data transmitted from the frame memory 22.

An output side of the 1H delay circuit 28 is connected to the above interpolating circuit 26 and the movement detecting circuit 27. An output side of the movement detecting circuit 27 is connected to the interpolating circuit 26.

Figure 8:
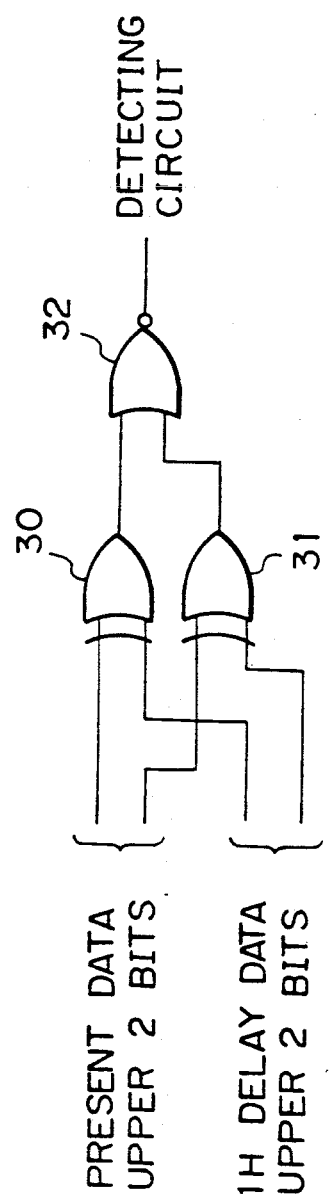
FIG. 8 is a logic circuit diagram showing the construction of a movement detecting circuit in FIG. 7.

As shown in FIG. 8, the movement detecting circuit 27 is composed of two EXOR circuits 30, 31 and one NOR circuit 32. Output sides of the EXOR circuits 30 and 31 are connected to the NOR circuit 32. The movement detecting circuit 27 receives upper two bits A1, A2 of the image data read out of the frame memory 22 and upper two bits B1, B2 of the image data transmitted from the 1H delay circuit 28. The bits A1 and B1 of the above image data are supplied to the EXOR circuit 30. The bits A2 and B2 of the image data are supplied to the EXOR circuit 31. The EXOR circuits 30, 31 and the NOR circuit 32 perform an exclusive OR operation and a NOR operation in accordance with a signal value of the supplied image data. When the brightness signal, etc. of the image data transmitted from the frame memory 22 are the same as those transmitted from the 1H delay circuit 28, the movement detecting circuit 27 turns off the interpolating circuit 26 by a signal at a high voltage level for example transmitted from the NOR circuit 32. When the brightness signal, etc. of the image data transmitted from the frame memory 22 are different from those transmitted from the 1H delay circuit 28, the movement detecting circuit 27 turns on the interpolating circuit 26 by a signal at a low voltage level transmitted from the NOR circuit 32. The upper two bits are set with respect to the image data supplied to the movement detecting circuit 27 to turn on the interpolating circuit 26 only when the brightness signal, etc. of the image data transmitted from the frame memory 22 are greatly different from those transmitted from the 1H delay circuit 28.

An output side of the interpolating circuit 26 is connected to a D/A converter 29 for converting a digital signal to an analog signal and is further connected to an unillustrated suitable signal processing circuit for transmitting an NTSC video signal for example.

The operation of the electronic zoom apparatus in this embodiment constructed as above will next be described.

A video signal as an analog signal transmitted from the image pickup device is converted to a digital signal by the A/D converter 21. With respect to the image data converted to the digital signal, picture information in only a range processed to be enlarged is selectively stored to the frame memory 22 by an address signal transmitted from the write address control circuit 23 in accordance with a control signal transmitted from the system control circuit 25.

For example, when an image 36 on a screen shown in FIG. 9 is processed to be enlarged twice, only data of the digital-converted image 35 of the first field having fields a, b, c, ... for example and the second field having fields 1, 2, 3, ... for example are stored to the frame memory 22 in synchronization with a timing signal transmitted from the write address control circuit 23.

The frame memory 22 alternately reads the respective image data of the first and second fields with respect to an image stored by the address signal transmitted from the read address control circuit 24 in accordance with the control signal transmitted from the system control circuit 25 from a time point when the image data of the first and second fields are written to the frame memory 22. Similar to the conventional apparatus, when the image is enlarged twice for example, the image data of the same address are repeatedly read twice in the above reading operation.

Namely, the image data are read by the timing signal transmitted from the read address control circuit 24 by a command from the system control circuit 25 in a sequential order a, 1, b, 2, ... for example corresponding to the first field in the picture scanning and in a sequential order a, 1, b, 2, ... for example corresponding to the second field. By repeating the same operation twice, the image data displayed on the screen are provided in a sequential order a, a, 1, 1, b, b, 2, 2, ... as shown in FIG. 10 so that the original image 35 is processed to be enlarged twice.

The magnification in enlargement of the image is set by timing signals transmitted from the write address control circuit 23 and the read address control circuit 24 by the control signal transmitted from the system control circuit 25. This magnification is set by suitably setting the relation between a timing in writing the image data to the frame memory 22 and a timing in reading these image data.

The writing operation of the image data to the frame memory 22 and the reading operation of the image data from the frame memory 22 are simultaneously performed in parallel to each other.

The image data thus read out of the frame memory 22 are directly transmitted to the interpolating circuit 26 and the movement detecting circuit 27. Further, these image data are delayed by an amount 1H through the 1H delay circuit 28 and are transmitted to the movement detecting circuit 27. Accordingly, the movement detecting circuit 27 detects a difference in brightness signal, etc. between the undelayed image data and the image data delayed by 1H as mentioned above. When this difference is same, a control signal for turning the interpolating circuit 26 off is transmitted to the interpolating circuit 26. Thus, the interpolating circuit 26 transmits the image data supplied from the frame memory 22 to the D/A converter 29 without performing the interpolation processing. On the other hand, when the above brightness signal, etc. are different, i.e., when the image is moved, the movement detecting circuit 27 transmits a control signal for turning the interpolating circuit 26 on to the interpolating circuit 26. Thus, the interpolating circuit 26 performs a known suitable interpolation processing between the image data supplied from the frame memory 22 and the image data delayed by the amount 1H and supplied from the 1H delay circuit 28. Thus, the interpolating circuit 26 transmits the interpolation-processed image data to the D/A converter 29.

Accordingly, the suitable interpolation processing is performed with respect to the moving image so that a contour portion of the image is not displayed unclearly when this image is displayed on the screen.

The image data supplied to the D/A converter 29 are converted to an analog signal and the analog-converted video information is converted to an NTSC video signal for example and is visually displayed on the display screen.

The above description relates to only the enlargement of the image, but it is also possible to reduce the size of the image by suitably setting the above-mentioned timing signals.

In the electronic zoom apparatus in this embodiment, it is not necessary to dispose a large amount of memory capacity for the frame memory 22 since the image data of only a portion processed to be enlarged or reduced are stored to the frame memory 22.

Further, it is possible to prevent the image from being shifted, i.e., the occurrence of a so-called image cutting phenomenon when the stored image data are read and displayed on the screen in a range processed to be enlarged from a memory storing the image data of the entire picture, as in the conventional apparatus, by using the movement detecting circuit 27, the 1H delay circuit 28 and the interpolating circuit 26 at a stage subsequent to the frame memory 22.

Namely, when the image data stored to an enlargement area 37 of a memory 36 shown in FIG. 11 are processed to be enlarged, the writing operation of the photographed image data to the memory 36 and the reading operation of the image data of the enlargement area 37 are simultaneously performed. Therefore, when the magnification in enlargement is twice for example, data of numbers 19 to 22 and numbers 27 to 28 in the enlargement area 37 are data stored before one field. However, with respect to the data of numbers after 29, the writing operation is performed together with the reading operation so that the read data are not data before the one field, but become data being written at the present time. Therefore, when a moving object is photographed and this image is processed to be enlarged, a shift is caused with respect to the image on the display screen since there is a time difference 1/60 second between the first and second fields. However, when the electronic zoom apparatus in this embodiment is used, the interpolation processing is performed by the interpolating circuit 26 so that the image displayed on the screen is not visually shifted in the above case.

Figure 13:
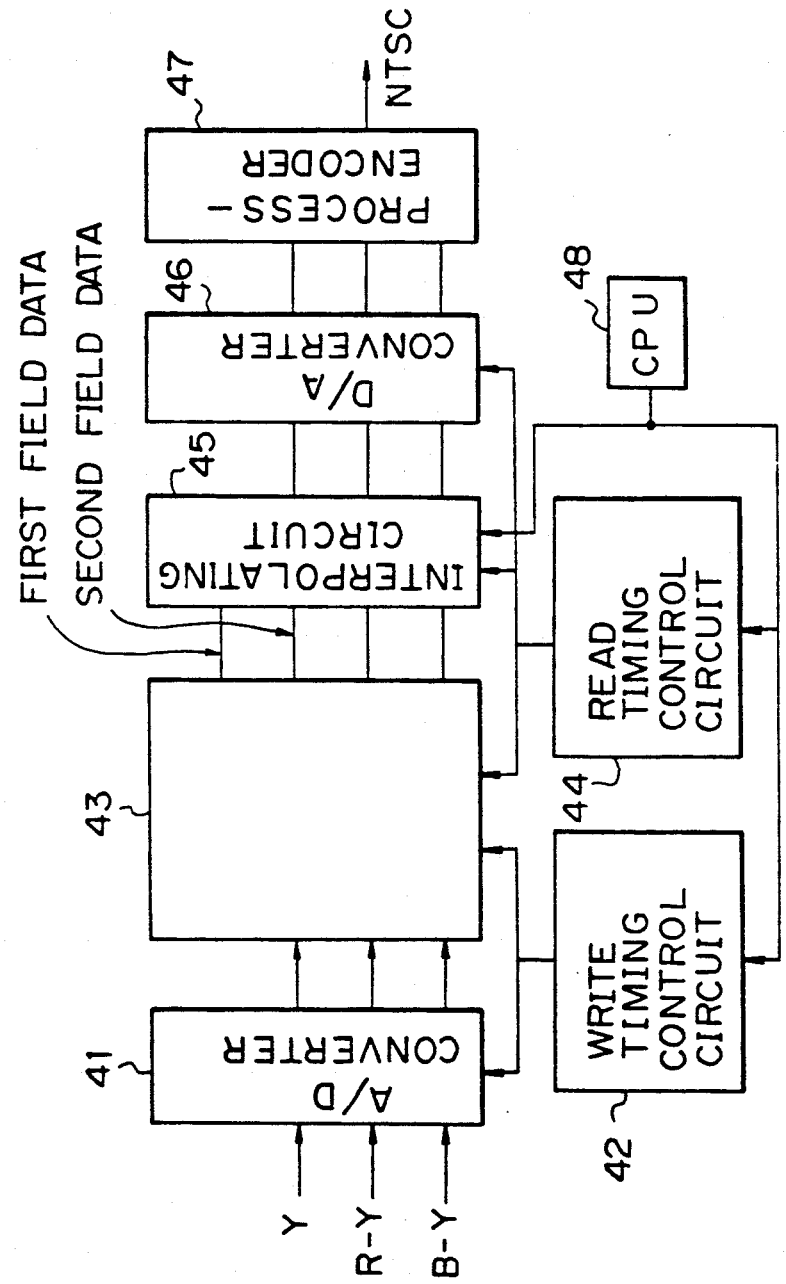
FIG. 13 is a block diagram showing the construction of the electronic zoom apparatus in the third embodiment of the present invention.

In the electronic zoom apparatus in a third embodiment of the present invention shown in FIG. 13, an interpolating circuit for effectively enabling the interpolation processing with respect to the above image data is disposed to visually display an electronic zoom-processed image more clearly.

As shown in FIG. 13, an unillustrated image pickup device is provided with an image pickup element or an image pickup tube and transmits color difference signals R-Y, B-Y as an analog signal and a brightness signal Y. This image pickup device is connected to an A/D converter 41 for converting a video signal composed of these color difference and brightness signals to a digital signal.

A write timing control circuit 42 is connected onto another input side of the A/D converter 41 and transmits a timing signal for converting only the video signal for executing an enlargement processing to a digital signal, and transmits an address signal. A frame memory 43 is connected onto an output side of the A/D converter 41 and respectively stores image data of so-called first and second fields converted to a digital signal in accordance with the address signal transmitted from the write timing control circuit 42. A read timing control circuit 44 is connected onto another input side of the frame memory 43 and transmits an address signal and various kinds of timing signals. An interpolating circuit 45 is connected onto an output side of the frame memory 43 and sets as interpolating data image data definitely determined by setting the image data supplied from the frame memory 43 as an address signal. The read timing control circuit 44 is connected onto one input side of the interpolating circuit 45, and a timing signal required at an executing time of the interpolation processing is supplied to this interpolating circuit 45. A digital/analog (which is briefly called D/A in the following description) converter 46 is connected onto an output side of the interpolating circuit 45 and converts a digital signal to an analog signal. The D/A converter 46 is connected to a process-encoder circuit 47 for executing various kinds of processings with respect to the supplied video signal and transmitting an NTSC video signal.

A central processing unit (which is briefly called CPU in the following description) 48 is connected onto the input sides of the write timing control circuit 42, the read timing control circuit 44 and the interpolating circuit 45, and transmits a control signal to the respective circuits.

Figure 12:
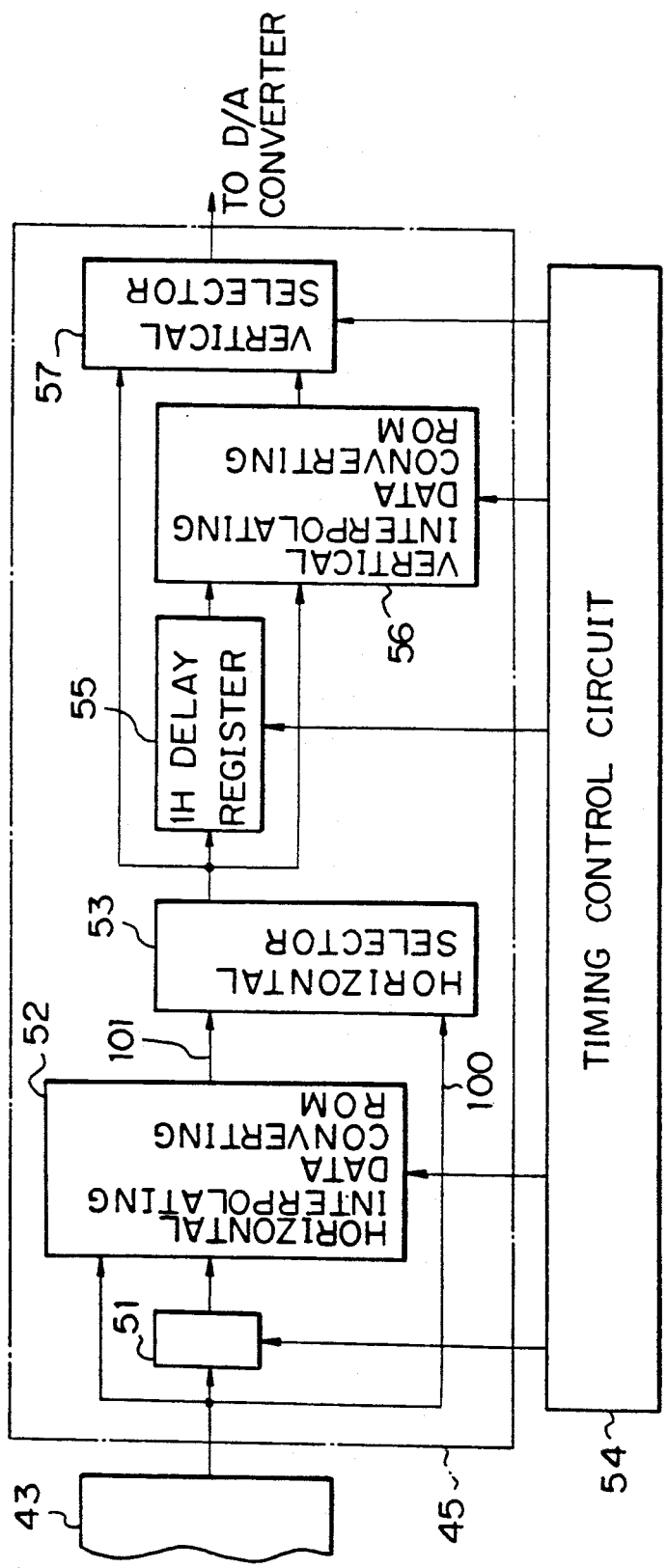
FIG. 12 is a block diagram showing the construction of an interpolating circuit used in the electronic zoom apparatus in a third embodiment of the present invention.

FIG. 12 shows one embodiment of the interpolating circuit 45 disposed in the above-mentioned electronic zoom apparatus. In FIG. 12, an output side of the frame memory 43 is connected to a delay register 51 for delaying horizontal image data on a screen by one picture element with respect to the image data stored to the frame memory 43. The output side of the frame memory 43 is also connected to a memory 52 for only converting and reading horizontal interpolating data (which is briefly called horizontal interpolating data converting ROM in the following description) and a horizontal selector 53. An output side of the delay register 51 is connected to the horizontal interpolating data converting ROM 52.

As shown in FIG. 14, the horizontal interpolating data converting ROM 52 stores results calculated in advance by a calculating formula described later and representing "a method for linearly allocating the distance between proximate picture elements" with respect to respective combinations of two supplied image data A and B. In this ROM 52, these results are stored in advance to memory addresses indicated by addresses composed of the above two supplied image data A and B.

The horizontal interpolating data converting ROM 52 sets as an address signal so-called real data undelayed and supplied from the frame memory 43 and delayed data supplied from the delay register 51. The horizontal interpolating data converting ROM 52 reads and transmits the calculated results stored in advance to addresses indicated by this address signal as data for interpolation.

The method for linearly allocating the distance between proximate picture elements is a method for performing the interpolation processing with respect to picture element data A and B of adjacent picture elements X and Y. In this method, when the interior division of the distance between the picture elements X and Y is performed at a ratio m:n at a point C, the image data at the point C are provided by the following formula $$C = (nA + mB)/(m+n).$$

In this embodiment, an element having an access time 25 nsec is used as this horizontal interpolating data converting ROM 52.

An output side of the horizontal interpolating data converting ROM 52 is connected to the horizontal selector 53. The horizontal selector 53 selects image data 100 not interpolation-processed and supplied from the frame memory 43 and image data 101 interpolation-processed and supplied from the horizontal interpolating data converting ROM 52 by a timing signal supplied from the timing control circuit 54. The timing control circuit 54 shown in FIG. 12 includes the write timing control circuit 42 and the read timing control circuit 44 shown in FIG. 13.

An output side of the horizontal selector 53 is connected to a 1H delay register 55 for delaying the image data in one horizontal scanning interval, a vertical interpolating data converting ROM 56 and a vertical selector 57. An output side of the 1H delay register 55 is connected to the vertical interpolating data converting ROM 56. The construction of the vertical interpolating data converting ROM 56 is similar to that of the above-mentioned horizontal interpolating data converting ROM 52. The undelayed image data of the image data of one horizontal scanning amount supplied from the horizontal selector 53, and the delayed image data of the image data of one horizontal scanning amount supplied from the 1H delay register 55 are supplied as an address signal to the vertical interpolating data converting ROM 56. The vertical interpolating data converting ROM 56 reads and transmits data stored to addresses indicated by this address signal, i.e., the data calculated with respect to the adjacent picture elements in the vertical direction by the above-mentioned distance linear allocating method. An output side of the vertical interpolating data converting ROM 56 is connected to the vertical selector 57. The vertical selector 57 selects either the image data of one horizontal scanning amount not interpolation-processed and supplied from the horizontal selector 53, or the image data of one horizontal scanning amount interpolation-processed and supplied from the vertical interpolating data converting ROM 56 by a timing signal supplied from the timing control circuit 54. The vertical selector 57 also transmits the selected result to the D/A converter 46 shown in FIG. 13.

Figure 15:
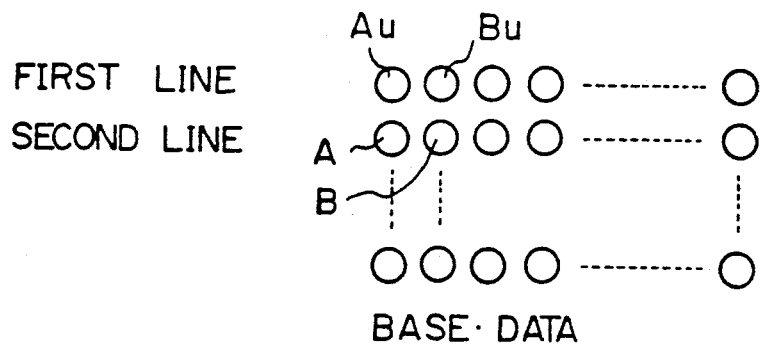
FIG. 15 is a view showing an arrangement of the image data before the interpolation processing.

In the electronic zoom apparatus constructed as above, as shown in FIG. 15, the image data transmitted from the frame memory 43 before the interpolation processing are shown by a circular mark O for example in the following description in the horizontal and vertical directions. Further, the image data adjacent to certain image data Au in the horizontal direction are shown by Bu. The image data adjacent to the image data Au in the vertical direction are shown by Al. The image data adjacent to the image data Bu in the vertical direction are shown by Bl. Further, an original image is assumed to be enlarged twice.

When the supplied image data are assumed to be the image data Au and Bu mentioned above, the interpolated image data represented by (Au+Bu)/2 as the results calculated by the abovementioned calculating formula of the distance linear allocating method are shown by a triangular mark Δ in the following description. In the horizontal interpolating data converting ROM 52, these interpolated image data are stored to an address indicated when the image data Au and Bu are set as an address signal in advance. At this time, as shown in FIG. 14, with respect to the address signal designating the address for storing the interpolated image data, the image data Au (corresponding to A in FIG. 14) are formed on the upper side and the image data Bu (corresponding to B in FIG. 14) are formed on the lower side.

The operation of the above electronic zoom apparatus will next be described in this state.

With respect to a video signal as an analog signal transmitted from the image pickup device, only image information processed to be enlarged on a screen is selected in the A/D converter 41 by a timing signal transmitted from the write timing control circuit 42 in accordance with a control signal transmitted from the CPU 48. Thereafter, this image information is converted to a digital signal and the converted image data are transmitted from the A/D converter 41 to the frame memory 43. The frame memory 43 stores the image data of first and second fields in accordance with an address signal transmitted from the write timing control circuit 42. The frame memory 43 reads the respective image data of the first and second fields of a stored picture, a so-called frame by an address signal transmitted from the read timing control circuit 44 in accordance with the control signal transmitted from the CPU 48. In this case, the frame memory 43 reads the respective image data of the first and second fields simultaneously or by repeating the first and second fields. The read image data are transmitted to the horizontal interpolating data converting ROM 52 disposed in the interpolating circuit 45, etc.

The image data Bu and the image data Au delayed by one picture element from the delay register 51 are supplied as an address signal from the frame memory 43 to the horizontal interpolating data converting ROM 52. As mentioned above, the horizontal interpolating data converting ROM 52 reads the above-mentioned stored results by setting the image data supplied from the frame memory 43 as the address signal. Accordingly, the horizontal interpolating data converting ROM 52 transmits the interpolated image data stored to the address indicated by the above address signal. Further, it is possible to perform the reading processing in the horizontal interpolating data converting ROM 52 at a high speed since the reading time with respect to the stored data is 25 nsec.

Thus, the horizontal interpolating data converting ROM 52 does not obtain the image data required to perform the interpolation processing by executing a calculation, but obtains the image data by reading the interpolated image data stored in advance. Further, an element having a very short time required to perform the reading operation is used as the horizontal interpolating data converting ROM 52 so that it is possible to perform the interpolation processing of the image transmitted from the A/D converter 41 at the real time.

Figure 16:
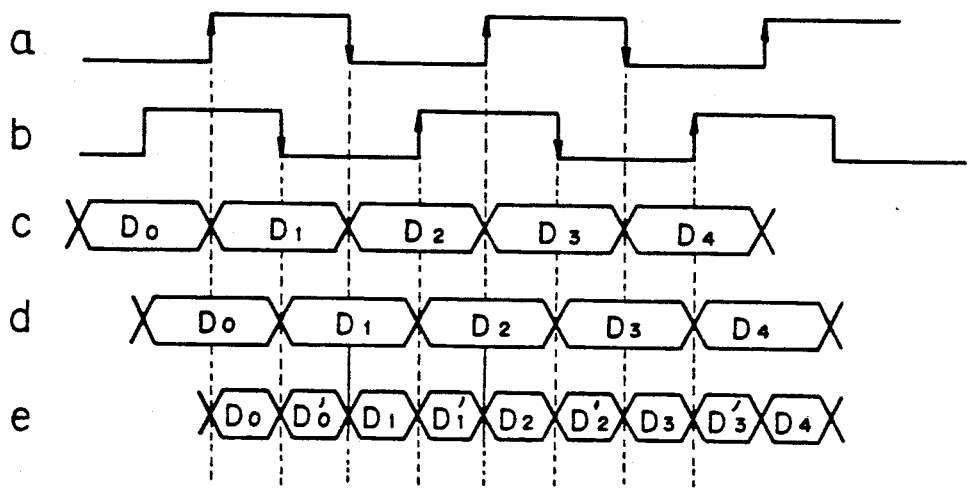
FIG. 16 is a timing chart showing the operation of the apparatus when the interpolation processing is performed.
Figure 17:
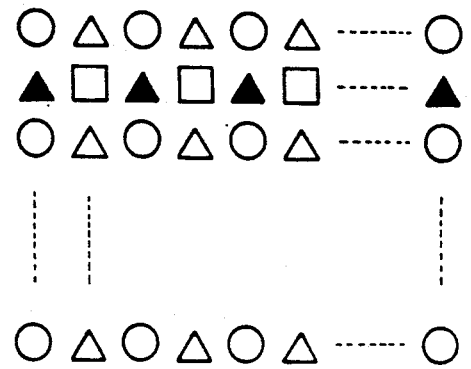
FIG. 17 is a view showing an arrangement of image data after the interpolation processing.

Then, the horizontal interpolating data converting ROM 52 transmits the above interpolated image data to the horizontal selector 53. The horizontal selector 53 selects these interpolated image data (Δ) and the uninterpolated image data (O) in accordance with a timing signal supplied from the timing control circuit 54. Namely, as shown in FIG. 16, image data D0, D1, D2, ... shown in FIG. 16-c and supplied from the frame memory 43 to the horizontal selector 53 are transmitted from the horizontal selector 53 as shown in FIG. 16-e in synchronization with the rise and fall of a timing signal shown in FIG. 16-a. On the other hand, the interpolated image data are transmitted from the horizontal selector 53 as shown in FIG. 16-e in synchronization with the rise and fall of a timing signal shown in FIG. 16-b. Accordingly, the image data transmitted from the horizontal selector 53 are provided in a sequential order D0, D0', D1, D1', . . . . In this case, reference numeral D0', etc. designate adjacent image data, e.g., the image data interpolated with respect to D0 and D1. Accordingly, as shown in FIG. 17, the horizontal image data are arranged in a sequential order O, Δ, O, Δ, . . . .

Next, with respect to the interpolation processing of the vertical image, the image data on a second line for example shown in FIG. 15 and the image data on a first line delayed by one horizontal scanning amount by the 1H delay register 55 are supplied as an address signal to the vertical interpolating data converting ROM 56. The processing of the vertical interpolating data converting ROM 56 is similar to that of the horizontal interpolating data converting ROM 52. Namely, the image data Au and Al shown in FIG. 15 are supplied as the address signal to the vertical interpolating data converting ROM 56. The interpolated image data stored to the address indicated by the above address signal and represented by (Au+Al)/2 provided by the above-mentioned calculating formula are read out and are shown by a black triangular mark ▲ in this figure. On a second column for example shown in FIG. 17, the interpolation processing is performed between the data after the horizontal image is interpolation-processed. In this case, similarly, the image data stored to the indicated address and represented by [{(Au+Bu)/2{+{(Al+Bl)/2}]/2 are read out of the vertical interpolating data converting ROM 56 and are shown by a square mark □. The vertical interpolating data converting ROM 56 transmits the interpolation-processed image data to the vertical selector 57.

The vertical selector 57 selects either the image data interpolation-processed by an operation similar to that of the above-mentioned horizontal selector 53, or the image data not interpolation-processed and supplied from the horizontal selector 53 by the timing signal supplied from the timing control circuit 54. The vertical selector 57 transmits the selected image data to the D/A converter 46.

The image data supplied to the D/A converter 46 are converted to an analog signal by the D/A converter 46 in synchronization with a timing signal supplied from the read timing control circuit 44. The analog-converted image information is converted to an NTSC video signal by the process-encoder circuit 47 and are visually displayed on the display screen.

A contour portion of the image can be smoothly displayed by operating the abovementioned interpolating circuit 45 when the image is particularly enlarged. Further, the interpolating circuit 45 does not execute multiplication, addition and division, but converts the supplied image data. Further, an element for enabling an access operation at a high speed can be used as the interpolating circuit 45. Accordingly, the interpolation processing can be performed at a high speed and the enlarging and reducing processings with respect to the photographed image data can be executed at the real time.

In addition, the interpolating circuit 45 disposed in this embodiment can be applied as the interpolating circuits used in the first and second embodiments.

As mentioned above, in accordance with the present invention, when an image is particularly processed to be enlarged, the image data of the first and second fields stored to a memory are synthesized and displayed on the display screen so that a contour portion of the image can be displayed clearly.

Further, in accordance with the present invention, only when a moving image is processed to be enlarged, the interpolation processing is performed with respect to the image so that the contour portion of the image can be displayed clearly even when an electronic zoom processing is performed with respect to the moving image.

Further, in accordance with the present invention, the calculation of the method for linearly allocating the distance between proximate picture elements is not performed by multiplication, addition and division within the interpolating circuit as in the conventional apparatus, but the results calculated by the above distance linear allocating method are stored in advance to memory means disposed in the interpolating circuit and the supplied image data are converted. Further, an element for enabling an access operation at a high speed is used as the memory means. Accordingly, the interpolation processing of the photographed image can be executed at the real time by a simplified circuit construction.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electronic zoom apparatus for use in an image pickup device, comprising:

image data selecting means for selecting image data to be zoomed from image data formed by an interlace scanning of said image pickup device and for outputting a first group of image data signals and a second group of image data signals, said selected image data including image data of a first field and image data of a second field, said first group of said image data signals representing said image data of said first field, and said second group of said image data signals representing said image data of said second field;

a first interpolation means electrically connected to said image data selecting means, for receiving said first group of said image data signals which include a first image datum signal representing a first image datum and a second image datum signal representing a second image datum adjacent to said first image datum, thereby reading out a first interpolated value between said first image datum and said second image datum, said first interpolated value being stored in advance in a first memory address indicated by said first image datum signal and said second image datum signal, for receiving said second group of said image data signals which include a third image datum signal representing a third image datum and a fourth image datum signal representing a fourth image datum adjacent to said third image datum, thereby reading out a second interpolated value between said third image datum and said fourth image datum, said second interpolated value being stored in advance in a second memory address indicated by said third image datum signal and said fourth image datum signal, and for outputting said first to fourth image data signals, a first interpolated datum signal representing said first interpolated value, and a second interpolated datum signal representing said second interpolated value; and a second interpolation means electrically connected to said first interpolation means, for receiving said first image datum signal and said third image datum signal thereby reading out a third interpolated value between said first image datum and said third image datum, said third interpolated value being stored in advance in a third memory address indicated by said received first image datum signal and said received third image datum signal, for receiving said first interpolated datum signal and said second interpolated datum signal, thereby reading out a fourth interpolated value between said first interpolated value and said second interpolated value, said fourth interpolated value being stored in advance in a fourth memory address indicated by said received first interpolated datum signal and said second interpolated datum signal, for receiving said second image datum signal and said fourth image datum signal, thereby reading out a fifth interpolated value between said second image datum and said fourth image datum, said fifth interpolated value being stored in advance in a fifth memory address indicated by said received second image datum signal and said received fourth image datum signal, and for outputting said first to fourth image data signals, said first and second interpolated data signals, and third to fifth interpolated data signals which respectively represent said third to fifth interpolated values.

2. An electronic zoom apparatus according to claim 1, in which said image data selecting means comprises:
   an A/D converter electrically connected to said image pickup device and a timing controlling means, for selecting said image data to be zoomed from said image data from said image pickup device, and for outputting as digital signals said first and second groups of said image data signals representing said selected image data in response to a first timing signal from said timing controlling means; and
   a frame memory electrically connected to said A/D converter and said timing controlling means, for receiving said outputted first and second groups of said image data signals, for storing said received first and second groups of said image data signals in response to a first address signal from said timing controlling means, and for outputting said stored first and second groups of said image data signals in response to a second address signal from said timing controlling means.

3. An electronic zoom apparatus according to claim 2, in which said first interpolation means comprises:
   a first delay register electrically connected to said frame memory and said timing controlling means, for delaying by an interval corresponding to one picture element each of said first to fourth image data signals constituting said first and second groups of said image data signals from said frame memory in response to a second timing signal from said timing controlling means, and for outputting said delayed first to fourth image signals;
   a first interpolating data converting ROM electrically connected to said frame memory, said first delay register and said timing controlling means, for reading out said first interpolated value and said second interpolated value on the basis of said second and fourth image data signal from said frame memory and said delayed first and third image data signals from said first delay register, and for outputting said first and second interpolated data signals in response to a third timing signal from said timing controlling means; and
   a first selector electrically connected to said frame memory and said first interpolating data converting ROM, for receiving said first and second groups of said image data signals from said frame memory and said first and second interpolated data signals from said first interpolating data converting ROM, and for outputting said received first and second groups of said image data signals and said received first and second interpolated data signals according to an order of arrangement of picture elements constituting said first to fourth image data and interpolated image data corresponding to said first and second interpolated values.

4. An electronic zoom apparatus according to claim 3, in which said second interpolation means comprises:
   a second delay register electrically connected to said first selector and said timing controlling means, for receiving said first to fourth image data signals and said first and second interpolated data signals from said first selector, for delaying said received first and second image data signals and said received first interpolated data signal by an interval of one horizontal scanning in response to a fourth timing signal from said timing controlling means, and for outputting said delayed first to fourth image data signals and said delayed first and second interpolated data signals;
   a second interpolating data converting ROM electrically connected to said first selector, said second delay register, and said timing controlling means, for reading out said third interpolated value on the basis of said delayed first image data signal from said second delay register and said third image data signal from said first selector, for reading out said fourth interpolated value on the basis of said delayed first interpolated datum signal from said second delay register and said second interpolated datum signal from said first selector, for reading out said fifth interpolated value on the basis of said delayed second image data signal from said second delay register and said fourth image data signal from said first selector, and for outputting said third to fifth interpolated data signals representing respectively said third to fifth interpolated values in response to a fifth timing signal from said timing controlling means; and
   a second selector electrically connected to said first selector, said second interpolating data converting ROM and said timing controlling means, for receiving said first to fourth image data signals and said first and second interpolated data signals from said first selector, for receiving said third to fifth interpolated data signals from said second interpolating data converting ROM, and for outputting said received first to fourth image data signals and said first to fifth interpolated data signals according to an order of arrangement of picture elements constituting said first to fourth image data and interpolated image data corresponding to said first to fifth interpolated values in response to a sixth timing signal from said timing controlling means.

5. An electronic zoom apparatus according to claim 3, in which said first interpolating data converting ROM is composed of semiconductor elements.

6. An electronic zoom apparatus according to claim 4, in which said second interpolating data converting ROM is composed of semiconductor elements.

* * * * *